United States Patent [19]

Kobayashi et al.

[11] 4,445,101

[45] Apr. 24, 1984

[54] DEFLECTING YOKE ASSEMBLY FOR MAKING A TRAPEZOIDAL RASTER

[75] Inventors: Toshio Kobayashi, Noda; Hideo Hishiki, Iwai, both of Japan

[73] Assignee: Victor Company of Japan, Limited, Yokohama, Japan

[21] Appl. No.: 399,697

[22] Filed: Jul. 19, 1982

[30] Foreign Application Priority Data

Jul. 21, 1981 [JP] Japan ............................ 56-108351[U]

[51] Int. Cl.³ .............................................. H01F 7/00
[52] U.S. Cl. .................................... 335/210; 335/212; 313/426
[58] Field of Search ............... 335/210, 212, 213, 211; 313/421, 426, 427, 428, 431

[56] References Cited

U.S. PATENT DOCUMENTS

| | | | |
|---|---|---|---|
| 3,004,188 | 10/1961 | Hutten | 313/426 X |
| 3,854,108 | 12/1974 | Horie et al. | 335/210 |
| 3,889,217 | 6/1975 | Martin et al. | 335/210 X |
| 3,906,418 | 9/1975 | Doshi et al. | 335/210 |
| 4,227,122 | 10/1980 | Fujisawa et al. | 335/213 X |
| 4,331,907 | 5/1982 | Laux et al. | 335/213 X |

*Primary Examiner*—George Harris
*Attorney, Agent, or Firm*—Lowe, King, Price & Becker

[57] ABSTRACT

A saturable reactor having a pair of series coils is attached to the outside surface of the cores of the vertical deflecting coils where the series coils are connected in series with a parallel connection of the horizontal deflecting coils. Each of the pair of coils of the saturable reactor is wound around a drum core which is magnetically biased by means of a permanent magnet. The saturable reactor is positioned so that leakage flux from the vertical deflecting coils is led into the drum cores, thereby changing the inductance of the pair of coils in accordance with the degree of vertical deflection. The horizontal deflecting currents flowing through the horizontal deflecting coils thus controlled to chage the width of raster providing a trapezoidal raster which is needed for projecting a TV picture on a large screen.

9 Claims, 16 Drawing Figures

TOP OF RASTER

BOTTOM OF RASTER

DEFLECTING YOKE ASSEMBLY FOR MAKING A TRAPEZOIDAL RASTER

BACKGROUND OF THE INVENTION

This invention relates generally to deflecting yoke assembly for a picture tube, and more particularly the present invention relates to a deflecting yoke assembly for making a trapezoidal raster required in a picture tube used for projecting TV pictures on a large screen.

Various types of TV picture projection systems have been developed hitherto so that TV pictures can be projected on a large screen. In some single-picture-tube projection systems, the shape of the raster made in the picture tube is trapezoidal so that a rectangular picture can be obtained on the projection screen. As is well known, such a trapezoidal raster can be obtained by changing the amplitude of the vertical deflection currents applied to the deflecting yoke. Namely, the amplitude of the vertical deflection currents is varied so that it becomes larger and larger in a direction from the beginning of the vertical scanning corresponding to the top of the screen toward the end of the same corresponding to the bottom of the screen. In conventional TV picture projection systems, therefore, a particular circuit arrangement having a reactor has been employed to achieve the above-mentioned change in the amplitude of the vertical deflection currents. As will be described later, such a particular circuit arrangement requires a number of parts, and therefore, it results in increase in manufacturing cost and in assembling time. Furthermore, since the reactor occupies a relatively large space, the entire system tends to be bulky. Moreover, the reactor is constructed of a closed magnetic path having a short gap length, the magnetic characteristic of the core is apt to change due to temperature variation. This lowers the reliability, while the operation of the system is unstable.

SUMMARY OF THE INVENTION

The present invention has been developed in order to remove the above-described drawbacks inherent to the conventional deflecting system.

It is, therefore, an object of the present invention to provide a new and useful deflecting yoke assembly for making a trapezoidal raster, which assembly is simple in construction because a large reactor is not required.

According to a feature of the present invention a reactor is disposed adjacent to the core of the deflecting yoke so that the amplitude of the horizontal deflection currents flowing through the coils of the reactor can be changed by leakage flux from the core so that the amplitude varies in accordance with the magnitude or degree of the vertical deflection.

BRIEF DESCRIPTION OF THE DRAWINGS

The object and features of the present invention will become more readily apparent from the following detailed description of the preferred embodiment taken in conjunction with the accompanying drawings in which.

The same or corresponding elements and parts are designated at like reference numerals throughout the drawings.

DETAILED DESCRIPTION OF THE INVENTION

Prior to describing the preferred embodiment of the present invention, the above-mentioned conventional circuit arrangement for making a trapezoidal raster will be described for a better understanding of the present invention.

Figure 1:
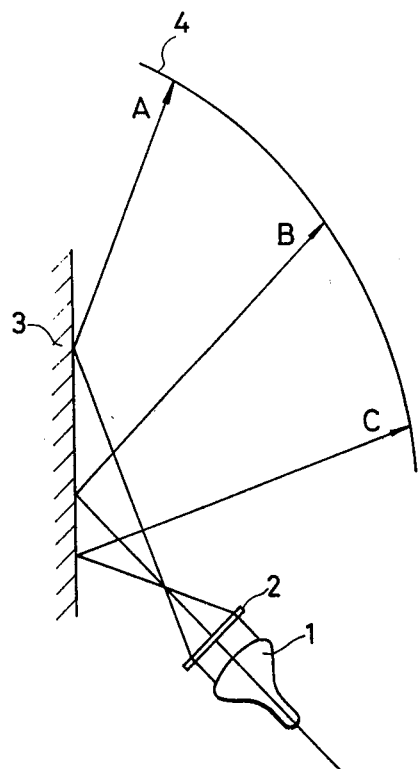
FIG. 1 is an explanatory diagram showing the relationship between a light source and a screen in a single-picture-tube TV picture projection system to which the present invention is adapted.

FIG. 1 illustrates a schematic view of a TV picture projection system to which the present invention is adapted. A TV picture tube 1 functioning as a light source, a lens 2, a mirror 3, and a screen 4 are arranged as shown in FIG. 1 so that the length of the projection system measured along the direction of the light beam is made short. The screen 4 is illuminated by the light beam emitted from the picture tube 1 so that TV pictures imaged on the surface of the screen 4 can been seen from either the front or rear side of the screen 4. Since the light beam from the picture tube 1 is reflected at the surface of the mirror 3 after being passed through the lens 2, the picture is projected on the screen 4 with a given magnification.

Considering three light paths A, B and C of light beams respectively emitted from the top, center and bottom of the raster on the picture tube 1, the lengths thereof have the relationship of $A > B > C$. Therefore, the magnifying power at the top of the TV picture is greater than that at the bottom. In order to make the sizes of the picture at the top and the bottom equal to each other, the difference in magnifying power should be compensated for by using a trapezoidal raster 5 having a narrower width at the top than the bottom as shown in FIG. 2.

Figure 2:
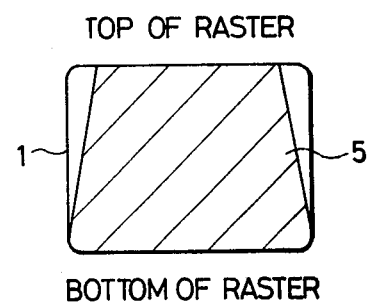
FIG. 2 shows a trapezoidal raster which is required to be made by the picture tube of FIG. 1.
Figure 3:
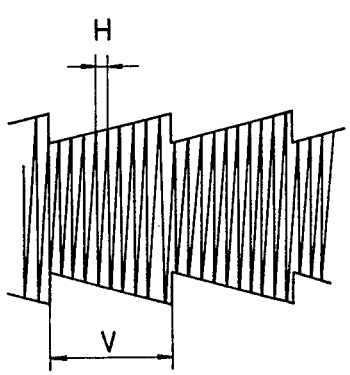
FIG. 3 is a waveform chart of the horizontal deflection currents modulated by the amplitude of the vertical deflection currents for obtaining the trapezoidal raster of FIG. 2.

Such a trapezoidal raster of FIG. 2 may be obtained by increasing the amplitude of the horizontal deflection currents respectively flowing through a pair of horizontal deflecting coils in a direction from the top of the picture toward the bottom. In other words, the amplitude of the horizontal deflection currents may be changed or modulated in accordance with the degree of vertical deflection as shown in FIG. 3. The references H and V in FIG. 3 respectively indicate one cycle of horizontal and vertical scanning.

Figure 4:
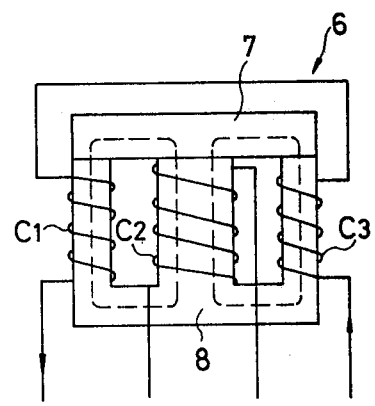
FIG. 4 is a schematic view of a reactor used in the conventional deflecting system for making a trapezoidal raster.
Figure 5:
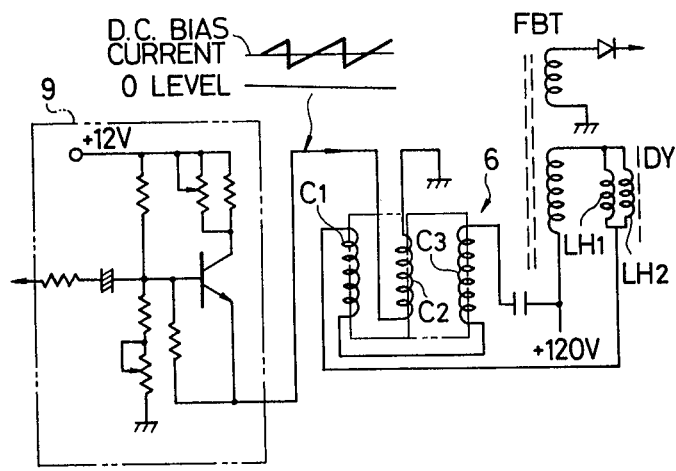
FIG. 5 is a circuit diagram of the conventional circuit arrangement employing the reactor of FIG. 4.
Figure 6:
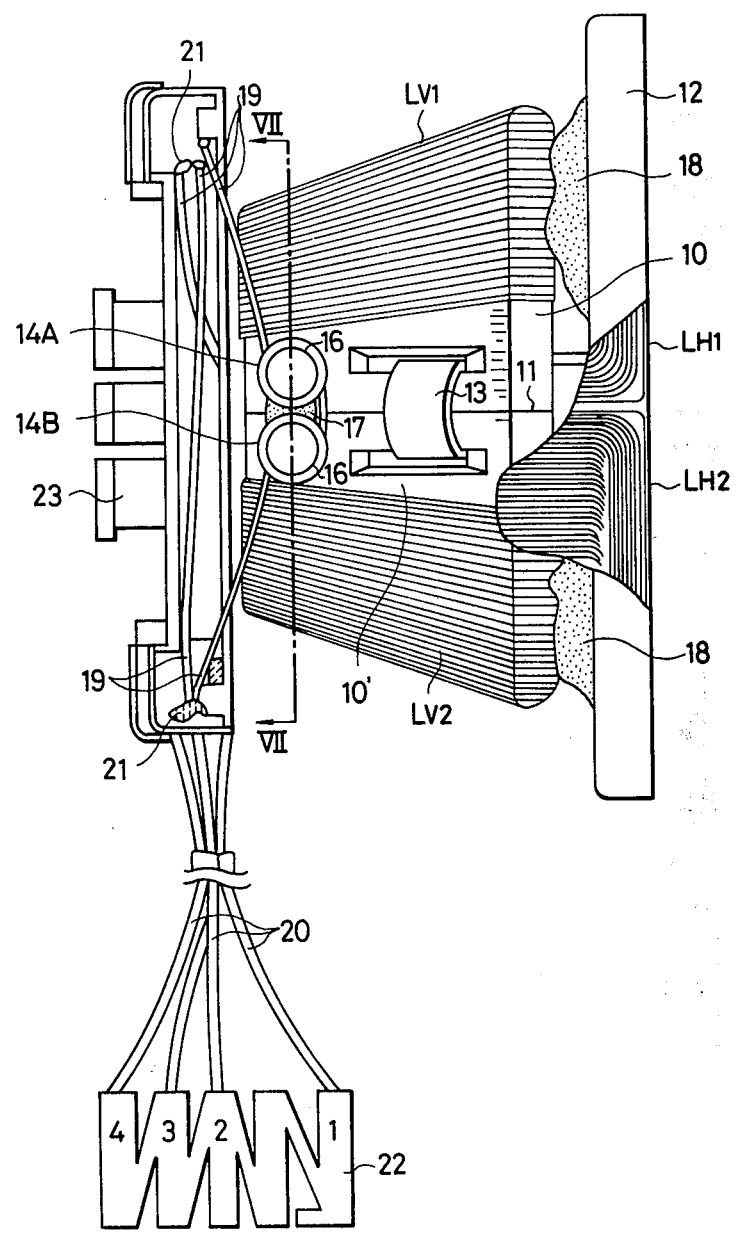
FIG. 6 is a side view of the deflecting yoke assembly according to the present invention.

FIG. 4 shows a reactor 6 which is used in a conventional deflection system for making a trapezoidal raster. The reactor 6 is incorporated in a circuit arrangement for horizontal deflection as shown in FIG. 6. The reactor 6 comprises an I-shaped core 7 and an E-shaped core 8 both combined as shown in FIG. 4, and three coils C1, C2, and C3 respectively wound around legs of the E-shaped core 8. Turning to FIG. 5, the coils C1 and C3 are connected is series and this series connection is connected in series with a parallel circuit of a pair of horizontal deflecting coils $L_{H1}$ and $L_{H2}$. The remaining coil C2 is connected to an output side of a sawtooth wave control signal generating circuit 9 which produces a vertical deflecting output. As shown in FIG. 5, a sawtooth wave control signal which is D.C. biased is fed to the coil C2 of the reactor 6. The reference FBT is a flyback transformer having a coil connected to the parallel connection of the pair of horizontal deflecting coils $L_{H1}$ and $L_{H2}$ and to the other end of the coil C3 via a capacitor. The reference DY indicates generally the deflecting yoke.

Briefly describing the operation of the conventional circuit of FIG. 5, the inductances of the coils C1 and C3 change in accordance with the sawtooth wave current flowing through the coil C2 so that the inductances decrease linearly from the beginning of vertical scanning toward the end of the same. Thus, the impedance of the horizontal deflecting circuit changes so that horizontal deflection currents flowing through the horizontal deflecting coils $L_{H1}$ and $L_{H2}$ have a waveform as shown in FIG. 3.

The present invention, however, does not require a particular circuit for flowing such a control signal or current from the vertical output circuit to a reactor connected to the horizontal deflecting coils, and will be described with reference to FIGS. 6 to 16.

Figure 8:
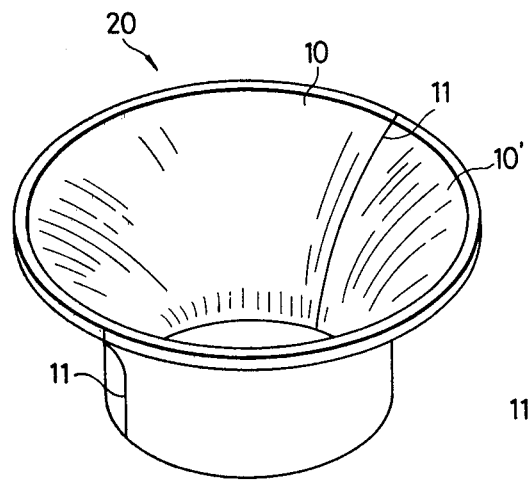
FIG. 8 is a perspective view of a core assembly of the vertical deflecting coils of FIG. 7.
Figure 9:
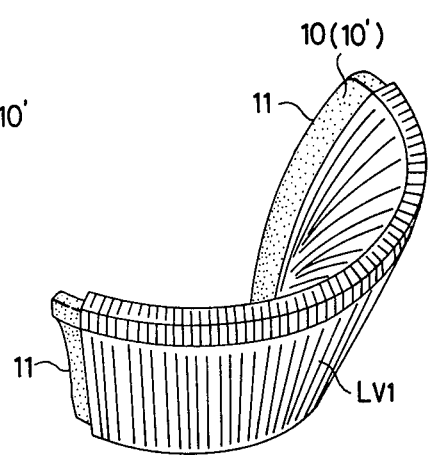
FIG. 9 is a perspective view of one of the vertical deflecting coils wound around a core half of the core assembly of FIG. 8.
Figure 11:
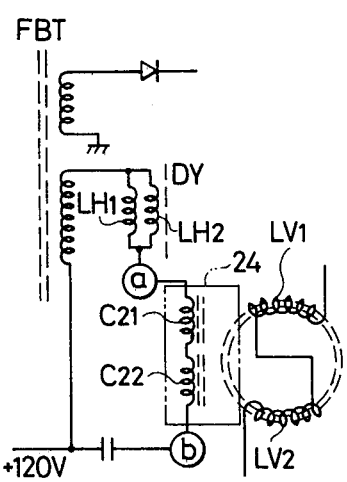
FIG. 11 is a circuit diagram of the main part of the deflecting yoke assembly of FIGS. 6 and 7.
Figure 12:
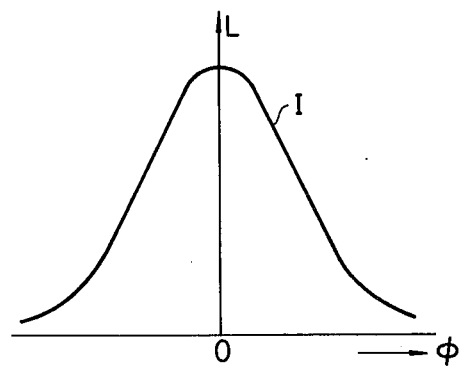
FIG. 12 through 16 are explanatory diagrams for the description of the operation of the deflecting yoke assembly of FIGS. 6 and 7.

FIG. 6 is a side view of a preferred embodiment of the deflecting yoke assembly according to the present invention. A pair of vertical deflecting coils $L_{V1}$ and $L_{V2}$ is wound around a pair of cores halves 10 and 10' which are connected to each other at connecting sections 11 as shown in FIGS. 8 and 9 to constitute a core assembly 20. The core halves 10 and 10' are fastened by a pair of clamps 13, only one of them being shown in FIG. 6. The vertical deflecting coils $L_{V1}$ and $L_{V2}$ constitute a toroidal coil. A pair of horizontal deflecting coils $L_{H1}$ and $L_{H2}$ is built in a separator 12 which is made of an insulating material such as a synthetic resin, where the separator 12 has a truncated conical shape. The separator 12 having the horizontal deflecting coils $L_{H1}$ and $L_{H2}$ therein is telescopically engaged with the inside of the core assembly 2. The separator 12 is fixed, by means of an adhesive 18 such as hot-melt, to the vertical deflecting coils $L_{V1}$ and $L_{V2}$ wound around the core assembly 20.

Figure 7:
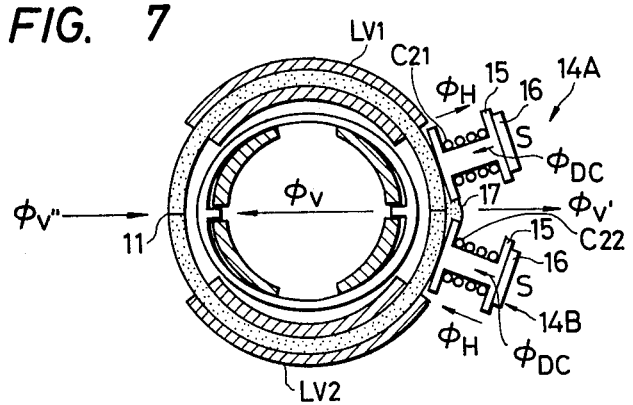
FIG. 7 is a cross-sectional view taken along the line VII—VII of FIG. 6.

FIG. 7 shows a cross-sectional view of the deflecting yoke assembly taken along the line VII—VII of FIG. 6. A pair of coil assemblies 14A and 14B constituting a reactor are fixed to the outside surface of the core assembly 20 by means of an adhesive 17 such as an epoxy resin. Each of the coil assemblies 14A and 14B comprises a drum core 15 and a coil C21 or C22. A permanent magnet 16 is attached to one end of the drum core 15 of each of the coil assemblies 14A and 14B so that D.C. magnetic bias is applied to the cores 15. Each of the drum cores 15 has an open magnetic path as shown.

A terminal 21 is provided at the rear or neck side of the separator 12, for the connection between lead wires 19 of various coils and external lead wires 20. The external lead wires 20 are connected to a connector 22 at their ends for easy connection with a terminal provided on a printed circuit board or the like (not shown). The separator 12 comprises a plurality of tongues 23 extending axially so that the deflecting yoke assembly of FIG. 6 can be attached to a picture tube with the tongues 23 tightened by a belt.

Figure 10:
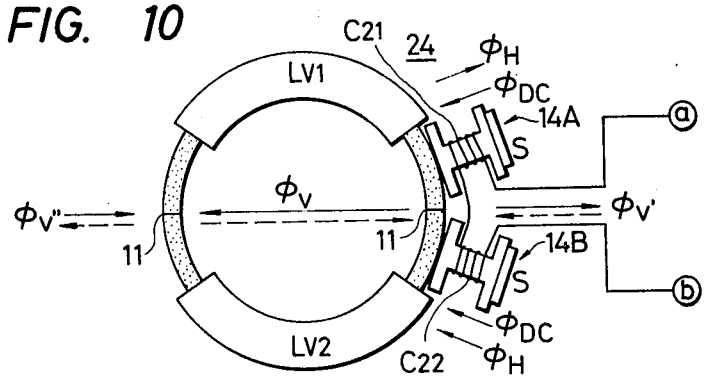
FIG. 10 is an explanatory diagram for the description of the operation of the deflecting yoke assembly of FIGS. 6 and 7.

The two coils C21 and C22 of the coil assemblies 14A and 14B are electrically connected in series so that their winding directions are opposite to each other as shown in FIG. 10. As shown in a circuit diagram of FIG. 11, the series connection of the two coils C21 and C22 is connected in series with a parallel connection of the two horizontal deflecting coils $L_{H1}$ and $L_{H2}$. Since the drum cores 15 of the coil assemblies 14A and 14B are located to be in contact with the core assembly 20 of the vertical deflecting coils $L_{V1}$ and $L_{V2}$, leakage flux from the core assembly 20 is led into the cores 15 of the coil assemblies 14A and 14B so that the combination of the vertical deflecting coils $L_{V1}$ and $L_{V2}$ and the pair of coils C21 and C22 constitute a saturable reactor 24. In detail, both the coil assemblies 14A and 14B are positioned on the outer surface of the core assembly 20 in the vicinity of one of the two connecting sections 11 so that leakage flux $\phi v'$ from the core assembly 20 acts on the drum cores 15. The permanent magnets 16 attached respectively to the drum cores 15 have a direction so that a D.C. magnetic bias $\phi DC$ is applied to each of the drum cores 15 in a direction that the magnetic flux is oriented toward the core assembly 20. In other words, the north pole of the magnet 16 is in contact with the outer end of each of the drum cores 15.

The deflecting coil assembly of FIGS. 6 and 7 operates as follows. As described at the beginning of this specification, the amplitude of the horizontal deflecting currents should be varied in accordance with the degree of vertical deflection as shown in FIG. 3 for obtaining a trapezoidal raster of FIG. 2. This means that the circuit arrangement of FIG. 11 having the saturable reactor 24 has to operate in substantially the same manner as the circuit of FIG. 5 having a reactor 6.

In the deflecting yoke assembly, vertical deflecting magnetic flux $\phi v$ exists, and therefore, leakage fluxes $\phi v'$ and $\phi v''$ are emitted outside from the core assembly 20 especially in the vicinity of the connecting sections 11. These leakage fluxes $\phi v'$ and $\phi v''$ change their magnitude in accordance with the magnitude of the vertical deflecting magnetic flux $\phi v$. Suppose that the direction of the vertical deflecting magnetic flux $\phi v$ at the beginning of vertical scanning (at the top of raster) is as indicated by an arrowed solid line in FIG. 7, the direction of leakage fluxes $\phi v'$ and $\phi v''$ are opposite to the direction of $\phi v$. The magnitude of the vertical deflecting magnetic flux $\phi v$ decreases as vertical scanning proceeds, and the direction thereof becomes opposite to that of before to increase the magnitude. Namely, at the end of vertical scanning (at the bottom of raster) the direction of the vertical deflecting magnetic flux is as indicated by an arrowed dotted line in FIG. 10. At this time the direction of the leakage fluxes $\phi v'$ and $\phi v''$ are opposite to that of the vertical deflecting magnetic flux $\phi v$. From the above it will be understood that the direction and the magnitude of the leakage fluxes $\phi v'$ and $\phi v''$ vary in accordance with the vertical deflecting magnetic flux $\phi v$.

Before the description of the operation of the saturable reactor 24, the operation of each of the coil assemblies 14A and 14B will be described. The cross-sectional area of each of the drum cores 15 of the coil assemblies 14A and 14B is selected so that the inductance of the coil C21 (C22) decreases due to the saturation in magnetic flux $\phi$ passing through the drum core 15. As a result, the inductance L and the magnetic flux $\phi$ have a relationship indicated by a curve I in FIG. 12.

Figure 13:
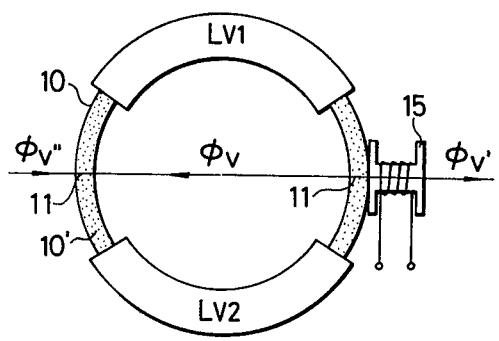
Figure 14:
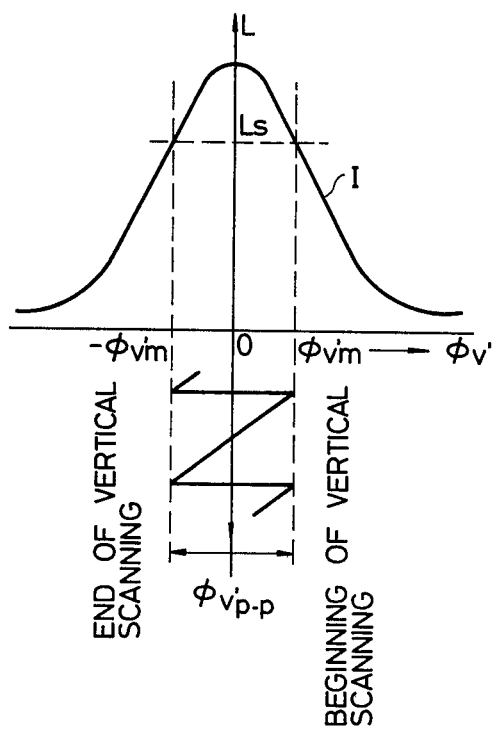

Let us assume that a drum core 15 having no permanent magnet is provided in the vicinity of the connecting section 11 as shown in FIG. 13. Since the coil (no nuemeral) wound around the drum core 15 of FIG. 13 is responsive to the leakage flux $\phi v'$ from the core assembly 20, the inductance of the coil changes as shown in FIG. 14. In detail, assuming that the magnitude of the flux in the drum core 15 changes from $\phi v'm$ to $-\phi v'm$, from the beginning to the end of vertical scanning, the inductance L of the coil first increases and exhibits a maximum value when the magnitude of the magnetic flux $\phi v'$ is zero. Then the inductance L decreases as the magnitude of the magnetic flux $\phi v$ approaches $-\phi v'm$. Therefore, if such a coil of FIG. 13 were used as the coil of the reactor 24 of FIG. 11, the raster would have a shape such that the width thereof at the midway point between the top and bottom is narrower than the width of the raster at the top and bottom.

Figure 15:
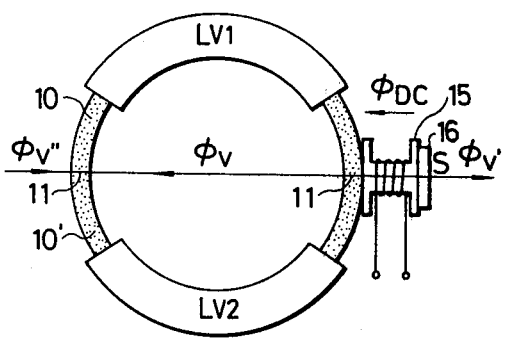
Figure 16:
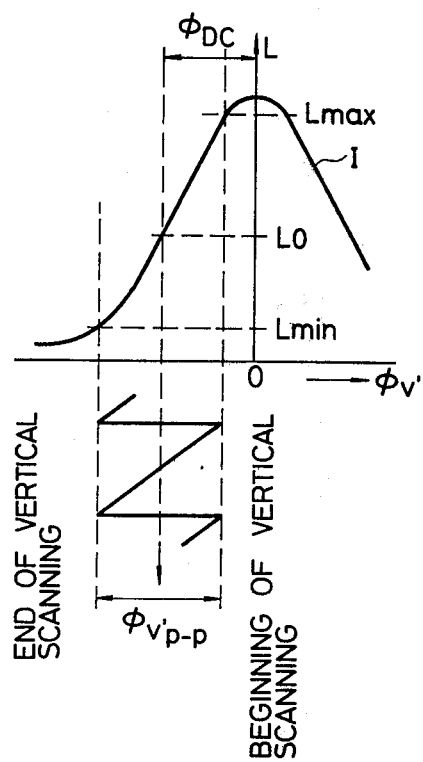

It will be understood that the inductance of the coil must decrease linearly from the beginning to the end of vertical scanning in order to obtain a trapezoidal raster. To this end the position of magnetic flux variation range $\phi v'p$-$p$ of FIG. 14 should be shifted to the left as shown in FIG. 16. This shifting can be achieved by magnetically biasing the drum core 15 by means of the permanent magnet 16 as shown in FIG. 15. Since the magnet 16 gives D.C. magnetic bias $\phi DC$ to the drum core 15, the inductance of the coil decreases substantially linearly as $L_{max}$ at the beginning of vertical scanning → $L_0$ at the middle of vertical scanning → $L_{min}$ at the end of vertical scanning as shown in FIG. 16. In order to obtain such a characteristic, the magnitude of D.C. magnetic bias has to be selected to be greater than the magnitude of the leakage magnetic flux $\phi v'm$ which exists in the drum core 15 at the beginning of vertical scanning, while the direction of the D.C. magnetic bias should be opposite to $\phi v'm$ to cancel the same.

Turning back to FIGS. 6 and 7, it will be understood that the inductance of each of the coils C21 and C22 of the coil assemblies 14A and 14B decreases substantially linearly as vertical scanning proceeds from the top to the bottom of raster if the magnitude of the D.C. magnetic bias given by the permanent magnets 16 is suitably set. As a result, the inductance between terminals "a" and "b" of the saturable reactor 24 decreases substantially linearly in accordance with the variation in the vertical deflecting currents flowing through the vertical deflecting coils $L_{V1}$ and $L_{V2}$. The pair of coils C21 and C22 are connected in series so that their winding directions are opposite to each other as described before. With this arrangement the drum cores 15 are prevented from being saturated with magnetic flux $\phi H$ generated by the horizontal deflecting currents respectively flowing in the coils C21 and C22.

Since the inductance between the terminals "a" and "b" of the saturable reactor 24 varies as described in the above in accordance with the degree of vertical deflection, the resultant impedance of the horizontal deflecting circuit comprised of the pair of horizontal deflecting coils $L_{H1}$ and $L_{H2}$ and the pair of coils C21 and C22 of the saturable reactor 24 decreases as vertical scanning proceeds from the top to the bottom of raster. Accordingly, the vertical deflecting currents flowing through the vertical deflecting coils $L_{H1}$ and $L_{H2}$ change as shown in FIG. 3 to make a trapezoidal raster on the picture tube as shown in FIG. 2.

The way of inductance variation of the saturable reactor 24 may be freely changed by selecting the magnetic characteristic of the drum cores 15 and/or by selecting the amount or magnitude of the D.C. magnetic bias. The magnetic characteristic of the drum cores 15 may be changed by selecting the material and the cross-sectional area of the drum core 15. Therefore, a desired trapezoidal raster may be readily obtained. Especially, since the inclination degree of the side edges of the trapezoidal raster can be changed by adjusting the magnitude of the D.C. magnetic bias, variations in trapezoidal shape throughout a number of deflecting yoke assemblies on mass production can be readily corrected.

In contrast with the aforementioned conventional arrangement in which a large reactor has been employed, in the present invention a reactor having a pair of coils C21 and C22 is attached to the outside surface of the core assembly 20 of the vertical deflecting yoke. This reduces the size of the projection system because no particular space for the reactor is needed. In addition, it is to be noted that the magnets 16 are spaced from the vertical and horizontal deflecting coils $L_{V1}$ and $L_{V2}$ and $L_{H1}$ and $L_{H2}$ so that no undesirable influence is given to the purity and convergence. Moreover, because each drum core 15 has an open magnetic path, inductance of the coils C21 and C22 is hardly affected by the variation in the permiability of the drum core 15. This provides a high stability with respect to ambient temperature variations, resulting in stable trapezoidal raster.

The above-described embodiment is just an example of the present invention, and therefore, it will be apparent for those skilled in the art that many modifications and variations may be made without departing from the spirit of the present invention.

What is claimed is:

1. A deflecting yoke assembly for making a trapezoidal raster, comprising:
   (a) a deflecting yoke having a pair of vertical deflecting coils and a pair of horizontal deflecting coils; and
   (b) a pair of saturable reactors each having a core positioned so that leakage flux from said vertical deflecting coils is applied thereinto, means for magnetically biasing said core in a predetermined direction, and at least one coil wound around said core, the coils of said pair of saturable reactors being connected in series such that their winding directions are opposite to each other, the series connected coils of said saturable reactors being connected in series with said pair of horizontal deflecting coils so that the horizontal deflecting current flowing through the pair of horizontal deflecting coils is modulated by a change in inductance of said saturable reactors in response to vertical deflecting current flowing through said vertical deflecting coils.

2. A deflecting yoke assembly as claimed in claim 1, wherein said core has an open magnetic path.

3. A deflecting yoke assembly as claimed in claim 1, wherein said core has a spool-like shape.

4. A deflecting yoke assembly as claimed in claim 1, wherein the magnetically biasing means comprises a permanent magnet attached to said core.

5. A deflecting yoke assembly as claimed in claim 4, wherein said magnet is attached to an outer end of a flange portion of said core having a spool-like shape.

6. A deflecting yoke assembly as claimed in claim 5, wherein the direction of said magnet is opposite to the direction of the leakage magnetic flux existing in said core at the beginning of vertical scanning.

7. A deflecting yoke assembly as claimed in claim 5, wherein the magnitude of said magnet is selected so that the magnetic bias given therefrom is greater than the magnitude of the leakage magnetic flux which exists in said core at the beginning of vertical deflection.

8. A deflecting yoke assembly as claimed in claim 1, wherein one end of said core of said saturable reactor is positioned in the vicinity of the connecting section between two halves of the core assembly of said vertical deflecting coils.

9. A deflecting yoke assembly as claimed in claim 8, wherein said core of said saturable reactor is radially arranged with respect to said core assembly of said vertical deflecting coils.

* * * * *